United States Patent
Uchida et al.

(10) Patent No.: US 10,096,408 B2
(45) Date of Patent: Oct. 9, 2018

(54) VOLTAGE NONLINEAR RESISTOR CERAMIC AND ELECTRONIC COMPONENT

(71) Applicant: TDK CORPORATION, Minato-ku, Tokyo (JP)

(72) Inventors: Masayuki Uchida, Tokyo (JP); Takahiro Itami, Tokyo (JP); Naoyoshi Yoshida, Tokyo (JP); Takeshi Oyanagi, Tokyo (JP); Koki Yamada, Tokyo (JP); Kazuaki Kajiwara, Tokyo (JP)

(73) Assignee: TDK CORPORATION, Tokyo (JP)

( * ) Notice: Subject to any disclaimer, the term of this patent is extended or adjusted under 35 U.S.C. 154(b) by 14 days.

(21) Appl. No.: 15/185,892

(22) Filed: Jun. 17, 2016

(65) Prior Publication Data
US 2016/0379739 A1 Dec. 29, 2016

(30) Foreign Application Priority Data

Jun. 26, 2015 (JP) ................................ 2015-128779
Jun. 26, 2015 (JP) ................................ 2015-129000

(51) Int. Cl.
*H01C 7/12* (2006.01)
*C04B 35/453* (2006.01)
*C04B 35/638* (2006.01)

(52) U.S. Cl.
CPC .............. *H01C 7/12* (2013.01); *C04B 35/453* (2013.01); *C04B 35/638* (2013.01); *C04B 2235/3213* (2013.01); *C04B 2235/3215* (2013.01); *C04B 2235/3218* (2013.01); *C04B 2235/3224* (2013.01); *C04B 2235/3225* (2013.01); *C04B 2235/3227* (2013.01); *C04B 2235/3229* (2013.01); *C04B 2235/3232* (2013.01); *C04B 2235/3236* (2013.01); (Continued)

(58) Field of Classification Search
CPC ........ H01C 7/12; C04B 35/453; C04B 35/638
USPC .......................................................... 338/21
See application file for complete search history.

(56) References Cited

U.S. PATENT DOCUMENTS 6,160,472 A * 12/2000 Arashi ................ C04B 35/4682
                                                                     252/519.15
6,184,769 B1 * 2/2001 Nakamura ............. H01C 7/112
                                                                     338/20

(Continued)

FOREIGN PATENT DOCUMENTS

| CN | 102249662 A | 11/2011 |
| CN | 103896575 A | 7/2014 |
| JP | 2014-133693 A | 7/2014 |

*Primary Examiner* — Kyung Lee
*Assistant Examiner* — Iman Malakooti
(74) *Attorney, Agent, or Firm* — Arent Fox LLP

(57) ABSTRACT

A voltage nonlinear resistor ceramic comprises: a Zn oxide; a Co oxide; an R (specific rare earth) oxide; a Cr oxide; an M1 (Ca, Sr) oxide; an M2 (Al, Ga, In) oxide; and strontium titanate. When content of the Zn oxide is assumed to be 100 mole portion in terms of Zn, content of the Co oxide is 0.30 to 10 mole portion in terms of Co, content of the R oxide is 0.10 to 10 mole portion in terms of R, content of the Cr oxide is 0.01 to 2 mole portion in terms of Cr, content of the M1 oxide is 0.10 to 5 mole portion in terms of M1, content of the M2 oxide is 0.0005 to 5 mole portion in terms of M2, and content of the strontium titanate is 0.10 to 5 mole portion in terms of $SrTiO_3$.

6 Claims, 1 Drawing Sheet

(52) U.S. Cl.
CPC ............... *C04B 2235/3241* (2013.01); *C04B 2235/3275* (2013.01); *C04B 2235/3286* (2013.01); *C04B 2235/3294* (2013.01); *C04B 2235/3298* (2013.01); *C04B 2235/6025* (2013.01); *C04B 2235/6567* (2013.01); *C04B 2235/786* (2013.01); *C04B 2235/79* (2013.01)

(56) References Cited

U.S. PATENT DOCUMENTS

| | | | | |
|---|---|---|---|---|
| 8,562,871 | B2 * | 10/2013 | Khatua | ............... C04B 35/4682 |
| | | | | 219/209 |
| 9,242,902 | B2 | 1/2016 | Itami et al. | |
| 2012/0161821 | A1 * | 6/2012 | Chang | ................ G11C 11/5685 |
| | | | | 327/109 |
| 2014/0171289 | A1 * | 6/2014 | Itami | .................... C04B 35/453 |
| | | | | 501/138 |

* cited by examiner

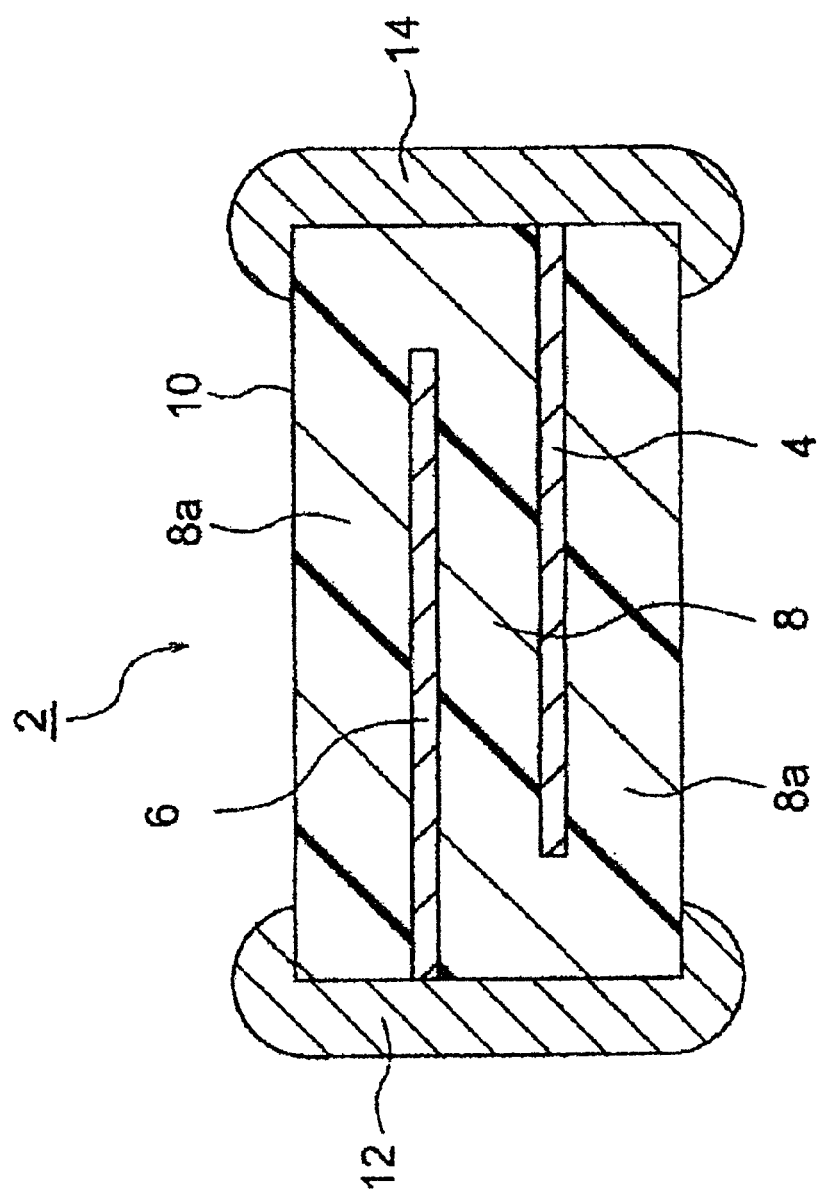

VOLTAGE NONLINEAR RESISTOR CERAMIC AND ELECTRONIC COMPONENT

BACKGROUND OF THE INVENTION

1. Field of the Invention

The present invention relates to a voltage nonlinear resistor ceramic preferably employed in the likes of a voltage nonlinear resistor layer of a laminated chip varistor, for example, and also relates to an electronic component in which the voltage nonlinear resistor ceramic is employed as a voltage nonlinear resistor layer.

2. Description of the Related Art

A varistor as one example of an electronic component having a voltage nonlinear resistor layer is used to protect IC circuits of electronic devices and so on by absorbing or removing an external surge (abnormal voltage), such as static electricity, or noise, for example.

In recent years, the speeding up of digital signals and transmission has been increasingly advancing, and also smaller and thinner chip components have become required in order to increase the integration degree of electronic components. In order to achieve a smaller and thinner varistor, the interlayer thickness needs to be reduced.

However, in a conventional voltage nonlinear resistor ceramic, there has been a problem that when the interlayer thickness is reduced, it becomes difficult to obtain good varistor characteristics.

To counter the above problem, the voltage nonlinear resistor ceramic shown in the following Patent Document 1 has been proposed. The voltage nonlinear resistor ceramic shown in Patent Document 1 solves the above problem particularly by including a specific amount of an R (rare earth element) oxide and barium titanate.

However, the voltage nonlinear resistor ceramic and electronic component described in Patent Document 1 lack moisture resistance when employed in a component where high moisture resistance is required, such as an in-vehicle component.

Patent Document 1: JP 2014-133693 A

SUMMARY OF THE INVENTION

The present invention has been made in view of such circumstances, and an object of the present invention is to provide a voltage nonlinear resistor ceramic and an electronic component capable of achieving good varistor characteristics, particularly, good anti-ESD characteristics, and, moreover, capable of being employed even in a component where high moisture resistance is required, such as an in-vehicle component.

In order to achieve the above object, a voltage nonlinear resistor ceramic according to a first aspect of the invention of the present application is a voltage nonlinear resistor ceramic, and comprises:

a Zn oxide; a Co oxide; an R oxide; a Cr oxide; an M1 oxide; an M2 oxide; and strontium titanate, R being at least one kind selected from a group consisting of Y, La, Ce, Pr, Nd, Sm, Eu, Gd, Tb, Dy, Ho, Er, Tm, Yb, and Lu, M1 being at least one kind selected from a group consisting of Ca and Sr, M2 being at least one kind selected from a group consisting of Al, Ga, and In, and when content of the Zn oxide is assumed to be 100 mole portion in terms of Zn, content of the Co oxide being 0.30 to 10 mole portion in terms of Co, content of the R oxide being 0.10 to 10 mole portion in terms of R, content of the Cr oxide being 0.01 to 2 mole portion in terms of Cr, content of the M1 oxide being 0.10 to 5 mole portion in terms of M1, content of the M2 oxide being 0.0005 to 5 mole portion in terms of M2, and content of the strontium titanate being 0.10 to 5 mole portion in terms of $SrTiO_3$.

In the first aspect of the invention of the present application, by adopting the above-described specific composition and content, particularly, by including a specific amount of strontium titanate, grain growth of crystal grain during sintering can be suppressed, and various kinds of varistor characteristics, particularly, good anti-ESD characteristics, can be obtained. Furthermore, moisture resistance can be improved.

Moreover, in order to achieve the above object, a voltage nonlinear resistor ceramic according to a second aspect of the invention of the present application is a voltage nonlinear resistor ceramic, and comprises:

a Zn oxide; a Co oxide; an R oxide; and a perovskite compound, the voltage nonlinear resistor ceramic substantively not comprising Ba, R being at least one kind selected from a group consisting of Y, La, Ce, Pr, Nd, Sm, Eu, Gd, Tb, Dy, Ho, Er, Tm, Yb, and Lu, and the perovskite compound being expressed by a general formula $ABO_3$, "A" being at least one kind of Ca and Sr, and "B" being at least one kind of Ti and Zr.

In the second aspect of the invention of the present application, by adopting the above-described specific composition and content, grain growth of crystal grain during sintering can be suppressed, and various kinds of varistor characteristics, particularly, good anti-ESD characteristics, can be obtained. Furthermore, moisture resistance can be improved.

In the voltage nonlinear resistor ceramic according to the second aspect of the invention of the present application, a molar ratio A/B of A and B in the perovskite compound is preferably not less than 0.995 and not more than 1.010.

An electronic component according to the present invention has a voltage nonlinear resistor layer configured from the above-described voltage nonlinear resistor ceramic.

The electronic component according to the present invention is not particularly limited. However, a laminated chip varistor, a disc varistor, a varistor composite element, and the like, are exemplified.

BRIEF DESCRIPTION OF THE DRAWINGS

The FIGURE is a cross-sectional view of a laminated chip varistor according to a first embodiment and a second embodiment of the present invention.

DESCRIPTION OF THE PREFERRED EMBODIMENTS

The present invention will be described below based on the first embodiment and the second embodiment shown in the FIGURE.

First Embodiment

Laminated Chip Varistor

As shown in the FIGURE, a laminated chip varistor 2 as one example of the electronic component includes an element body 10 having a configuration that internal electrode layers 4 and 6, an interlayer voltage nonlinear resistor layer 8, and outer protective layers 8a are laminated. Formed at both ends of this element body 10 are a pair of external terminal electrodes 12 and 14 electrically connected respectively with the internal electrode layers 4 and 6 disposed inside the element body 10. Although the shape of the element body 10 is not particularly limited, it is generally a cuboid shape. Moreover, its dimensions are not particularly limited, and should be appropriately determined according to application. However, generally, these are approximately width (0.6 to 5.6 mm)×length (0.3 to 5.0 mm)×thickness (0.3 to 1.9 mm).

The internal electrode layers 4 and 6 are laminated such that each of their end surfaces is exposed on surfaces of the two opposing ends of the element body 10. The pair of external terminal electrodes 12 and 14 are formed on both ends of the element body 10, and are respectively connected to the exposed end surfaces of the internal electrode layers 4 and 6 to configure a circuit.

In the element body 10, at both outer ends in a lamination direction of the internal electrode layers 4 and 6 and the interlayer voltage nonlinear resistor layer 8, the outer protective layers 8a are disposed to protect the inside of the element body 10. A material of the outer protective layer 8a may be the same as or different from a material of the interlayer voltage nonlinear resistor layer 8.

Internal Electrode Layer

Although a conductive material included in the internal electrode layers 4 and 6 is not particularly limited, such a conductive material is preferably configured by Pd or an Ag—Pd alloy. The Pd content in the Ag—Pd alloy is preferably 95 wt % or more, assuming the Ag—Pd alloy to be 100 wt %. Thickness of the internal electrode layers 4 and 6 should be appropriately determined according to application. However, it is generally about 0.5 to 5 μm.

External Terminal Electrode

Although a conductive material included in the external terminal electrodes 12 and 14 is not particularly limited, generally, the likes of Ag or an Ag—Pd alloy is employed. Thickness of the external terminal electrodes 12 and 14 should be appropriately determined according to application. However, it is generally about 10 to 50 μm.

Interlayer Voltage Nonlinear Resistor Layer

The interlayer voltage nonlinear resistor layer 8 is configured by the voltage nonlinear resistor ceramic according to the first embodiment. The voltage nonlinear resistor ceramic includes: a Zn oxide; a Co oxide; an R oxide; a Cr oxide; an M1 oxide; an M2 oxide; and strontium titanate.

The Zn oxide (zinc oxide) acts as a substance exerting an excellent voltage nonlinearity in voltage/current characteristics and a large surge withstand capability.

The Co oxide functions as an acceptor (electron scavenger), and acts as a substance maintaining varistor characteristics. The content of Co oxide with respect to a zinc oxide 100 mole portion is 0.30 to 10 mole portion, preferably 0.50 to 7.0 mole portion, and more preferably 0.50 to 5.0 mole portion in terms of Co.

When the content of Co oxide is too small, it tends to become easier for a leakage current to increase and for ESD withstand capability to decrease. When the content of Co oxide is too large, ESD withstand capability particularly tends to decrease due to insufficient sintering. In both cases, it is unlikely that good varistor characteristics can be achieved.

Leakage current is a current flowing through a voltage nonlinear resistor element at a voltage at which a semiconductor element is generally used. The leakage current is preferably small.

ESD withstand capability is a guide to magnitude of static electricity able to be absorbed by the varistor. For example, it can be measured by the electrostatic discharge immunity test specified in the International Electrotechnical Commission (IEC) standard IEC61000-4-2. Moreover, the larger ESD withstand capability is, the more excellent anti-ESD characteristics are.

Co tends to penetrate inside grains of the Zn oxide during sintering. Moreover, by Co penetrating inside grains of the Zn oxide, their resistance rises. By resistance of grains of the Zn oxide rising, the leakage current is considered to decrease.

The R oxide acts as a substance increasing a diffusion rate of oxygen diffusing toward a crystal grain boundary. Adding the R oxide enables a degree of sintering of a sintered body to be increased and sintering of the sintered body to be sufficiently performed.

The R element configuring the R oxide is at least one selected from Y, La, Ce, Pr, Nd, Sm, Eu, Gd, Tb, Dy, Ho, Er, Tm, Yb, and Lu. It preferably includes at least Pr or Tb, and particularly preferably includes at least Pr. The content of R oxide with respect to a zinc oxide 100 mole portion is 0.10 to 10 mole portion, preferably 0.10 to 7.0 mole portion, and more preferably 0.20 to 5.0 mole portion in terms of R.

Setting the content of R oxide within the above range makes it easier for the voltage nonlinear resistor ceramic to be maintained in a semiconductor state and also makes it possible to increase the diffusion rate of oxygen diffusing toward the crystal grain boundary.

When the content of R oxide is too small, ESD withstand capability particularly tends to decrease due to insufficient sintering. When the content of R oxide is too large, R tends to be more easily deposited on a surface of the voltage nonlinear resistor ceramic. By R being more easily deposited, reliability more easily deteriorates, and the leakage current and ESD withstand capability tend to deteriorate. In both cases, it is unlikely that good varistor characteristics can be achieved.

The Cr oxide functions as an acceptor (electron scavenger), and acts as a substance maintaining varistor characteristics. Furthermore, the Cr oxide has an effect of suppressing grain growth of crystal grain during sintering. The content of Cr oxide with respect to a zinc oxide 100 mole portion is 0.01 to 2.00 mole portion, preferably 0.01 to 1.00 mole portion, and more preferably 0.1 to 1.00 mole portion in terms of Cr.

When the content of Cr oxide is too small, sometimes, the effect of suppressing grain growth of crystal grain during sintering cannot be sufficiently obtained. Furthermore, the leakage current tends to more easily increase. When the content of Cr oxide is too large, ESD withstand capability tends to more easily decrease.

Note that when grain growth of crystal grain cannot be sufficiently suppressed and grain size of crystal grain increases, the number of grain boundaries existing between the internal electrodes gets smaller. Generally, the larger the number of grain boundaries is, the higher the varistor voltage becomes. Thus, by suppressing grain growth of crystal grain, the varistor voltage can be kept high.

Moreover, when the varistor voltage increases, the current flowing in a low voltage region gets smaller. Thus, the higher the varistor voltage is, the smaller the leakage current tends to become.

The M1 oxide functions as an acceptor (electron scavenger), and acts as a substance maintaining varistor characteristics. M1 is at least one kind selected from Ca and Sr, and preferably includes Sr. The reason M1 preferably includes Sr is for better nonlinearity. The content of M1 oxide with respect to a zinc oxide 100 mole portion is 0.10 to 5.0 mole portion, preferably 0.10 to 3.0 mole portion, and more preferably 0.10 to 2.0 mole portion in terms of M1.

When the content of M1 oxide is too small, ESD withstand capability particularly tends to decrease. When the content of M1 oxide is too large, the likes of grain size fluctuation more easily increases, and the leakage current and ESD withstand capability tend to more easily deteriorate. In both cases, it is unlikely that good varistor characteristics can be achieved.

The M2 oxide functions as a donor (electron transfer agent), and acts as a substance maintaining varistor characteristics. M2 is at least one kind of element selected from a group consisting of Al, Ga, and In, and preferably includes Ga. The reason M2 preferably includes Ga is to lower the temperature of firing.

The content of M2 oxide with respect to a zinc oxide 100 mole portion is 0.0005 to 5.0 mole portion, preferably 0.0005 to 3.0 mole portion, and more preferably 0.001 to 2.0 mole portion in terms of M2.

When the content of M2 oxide is too small, ESD withstand capability tends to decrease due to donor insufficiency. When the content of M2 oxide is too large, the leakage current tends to increase due to donor surplus. In both cases, it is unlikely that good varistor characteristics can be achieved.

Moreover, M2 tends to penetrate inside grains of the Zn oxide during sintering. Moreover, by M2 penetrating inside grains of the Zn oxide, their resistance lowers. It is considered that when the content of M2 oxide is too large, resistance of grains of the Zn oxide tends to lower and the leakage current tends to increase.

The strontium titanate ($SrTiO_3$) has a sintering suppressing effect. That is, it has an effect of suppressing grain growth of crystal grain during sintering. The content of strontium titanate with respect to a zinc oxide 100 mole portion is 0.10 to 5.0 mole portion, preferably 0.10 to 3.00 mole portion, and more preferably 0.10 to 1.00 mole portion in terms of $SrTiO_3$.

Note that the above sintering suppressing effect cannot be achieved by separately adding strontium oxide and titanium oxide instead of strontium titanate.

The reason the above sintering suppressing effect cannot be achieved by separately adding strontium oxide and titanium oxide is considered to be as indicated below.

First, the reason the sintering suppressing effect during sintering can be achieved in the case where strontium titanate is added is considered to be because strontium titanate is a perovskite compound.

In contrast, in the case where strontium oxide and titanium oxide are added separately, although it also sometimes occurs that the strontium oxide and the titanium oxide react during sintering to become strontium titanate, it is not the case that the entire amount becomes strontium titanate. Moreover, even if strontium titanate is generated by the aforementioned reaction during sintering, the crystal grain has already ended up undergoing grain growth due to the sintering. Thus, the above sintering suppressing effect is considered to be unachievable by separately adding strontium oxide and titanium oxide.

When the content of strontium titanate is too small, grain growth of crystal grain ends up occurring, and crystal grain size tends to become non-uniform. As a result, the leakage current tends to increase, and good varistor characteristics are unlikely to be achieved. When the content of strontium titanate is too large, ESD withstand capability particularly tends to decrease due to insufficient sintering.

Note that strontium titanate having a molar ratio of Sr/Ti appropriately adjusted roughly in the range of 0.90 to 1.10 can be employed.

Now, the effect of suppressing grain growth of crystal grain during sintering can be achieved even if barium titanate ($BaTiO_3$) is employed instead of strontium titanate. However, when barium titanate is employed, moisture resistance ends up significantly decreasing. In other words, in the present embodiment, by employing strontium titanate instead of barium titanate, moisture resistance can be significantly improved.

In addition, by employing strontium titanate instead of barium titanate, the above-mentioned content of Cr oxide can be reduced. That is, the preferable content of Cr oxide is smaller when employing strontium titanate than when employing barium titanate. Moreover, by reducing the content of Cr oxide, ESD withstand capability improves.

Note that the reason the content of Cr oxide can be reduced by employing strontium titanate instead of barium titanate is considered to be because the sintering suppressing effect is larger and the content of Cr oxide required for sintering suppression is smaller for strontium titanate than for barium titanate.

In addition, the reason moisture resistance can be significantly improved by employing strontium titanate instead of barium titanate is considered to be as indicated below.

During firing of a green chip which will be mentioned later, sometimes, when barium titanate and Sr oxide coexist, barium of the barium titanate is substituted by Sr, and barium oxide is released. Now, the barium oxide easily reacts with water vapor to change into barium hydroxide. Furthermore, barium hydroxide easily ionizes into a barium ion and a hydroxide ion in water. Such change of the barium hydroxide is considered to result in the voltage nonlinear resistor ceramic becoming discolored, varistor characteristics deteriorating, and so on.

Now, when strontium titanate is employed instead of barium titanate, barium oxide is not released. Moreover, it is more difficult for Sr oxide to react with water vapor and more difficult for Sr oxide to change into a hydroxide, compared to Ba oxide. Thus, moisture resistance can be significantly improved by employing strontium titanate instead of barium titanate.

The voltage nonlinear resistor ceramic according to the present embodiment may further include a compound other than the above-described compounds, in a range allowing the object of the present invention to be achieved. However, when Bi oxide and Sb oxide are included, the leakage current easily increases, and ESD withstand capability easily decreases. Thus, the lower the content of Bi oxide and Sb oxide is, the more preferable it is. Moreover, it is particularly preferable that Bi oxide and Sb oxide are not included.

In the present specification, the varistor voltage refers to a voltage when a current of 1 mA flows. Varistor characteristics refer to various characteristics such as varistor voltage, leakage current, and ESD withstand capability.

Various conditions such as a thickness and the number of laminations of the interlayer voltage nonlinear resistor layer 8 should be appropriately determined according to purpose and application. In the present embodiment, for example, the thickness of the interlayer voltage nonlinear resistor layer 8 is approximately 5 to 100 μm, and the number of laminations is approximately 10 to 50. Further, the thickness of the outer protective layer 8a is approximately 100 to 500 μm.

Method of Manufacturing Laminated Chip Varistor

Next, one example of a method of manufacturing the laminated chip varistor 2 according to the first embodiment will be described.

In the first embodiment, a green chip is prepared by an ordinary printing method or sheet method using a paste and then fired. After that, the green chip has external terminal electrodes printed or transferred thereon and is fired, whereby the laminated chip varistor is manufactured. The method of manufacturing will be described specifically below.

First, a paste for voltage nonlinear resistor layer, a paste for internal electrode layer, and a paste for external terminal electrode are respectively prepared. A voltage nonlinear resistor material (a voltage nonlinear resistor ceramic powder) is prepared, and this is made into a coating to prepare the paste for voltage nonlinear resistor layer.

The paste for voltage nonlinear resistor layer may be an organic-based coating in which the voltage nonlinear resistor material and an organic vehicle are mixed, or may be a water-based coating.

As for the voltage nonlinear resistor material, the above-mentioned oxides of main component and subcomponents or a mixture or composite oxide thereof, can be employed. In addition to the above, a mixture of various compounds appropriately selected from, for example, carbonate, oxalate, nitrate, hydroxide, organic metallic compound and the like, which become the above-mentioned oxides or composite oxides after firing, can also be employed.

The content of each component in the voltage nonlinear resistor material should be determined such that the composition after firing attains the above-mentioned voltage nonlinear resistor ceramic composition. For these base powders, a powder having an average grain size of about 0.3 to 2 µm is generally used.

The organic vehicle is made by dissolving a binder in an organic solvent. The binder used for the organic vehicle is not particularly limited, and should be appropriately selected from various ordinary binders such as ethyl cellulose and polyvinyl butyral. The organic solvent to be used is also not particularly limited, and should be appropriately selected from various organic solvents such as terpineol, butyl carbitol, aceton, and toluene, in accordance with the usage method, such as printing method and sheet method.

Further, when the paste for voltage nonlinear resistor layer is configured as a water-based coating, it is only required to mix a water-based vehicle in which the likes of a water-soluble binder and a dispersing agent are dissolved in water, with a dielectric material. The water-soluble binder is not particularly limited, and for example, polyvinyl alcohol, cellulose, water-soluble acrylic resin and the like can be employed.

The paste for internal electrode layer is prepared by mixing the above-mentioned organic vehicle and the above-mentioned various conductive materials or various oxides, organic metallic compounds, resinates and the like that serve as the above-mentioned conductive materials after firing. Further, the paste for external terminal electrode needs to only be prepared similarly to this paste for internal electrode layer.

The content of the organic vehicle in each of the above pastes is not particularly limited. For example, generally, the content of binder should be approximately 1 to 5 wt %, and the content of solvent should be approximately 10 to 50 wt %. Further, in each paste, additives selected from various dispersing agents, plasticizing agents, dielectric materials, insulating materials, and so on, may be included as necessary. The total amount of these additives is preferably 10 wt % or less.

When employing a printing method, the paste for voltage nonlinear resistor layer is printed on a substrate of PET or the like a plurality of times with a predetermined thickness to form an outer protective layer 8a of a green body.

Next, on this outer protective layer 8a, the paste for internal electrode layer is printed in a predetermined pattern to form an internal electrode layer 4 of the green body. Next, similarly to above, on this internal electrode layer 4, the paste for voltage nonlinear resistor layer is printed a plurality of times with a predetermined thickness to form an interlayer voltage nonlinear resistor layer 8 of the green body.

Next, on the interlayer voltage nonlinear resistor layer 8, the paste for internal electrode layer is printed in a predetermined pattern to form an internal electrode layer 6 of the green body. The internal electrode layers 4 and 6 are printed so as to be exposed on mutually opposing end surfaces.

Finally, similarly to above, on the internal electrode layer 6, the paste for voltage nonlinear resistor layer is printed a plurality of times with a predetermined thickness to form the outer protective layer 8a of the green body. After that, the green body is pressure-bonded while being heated and cut in a predetermined shape, after which the cut portions are peeled off from the substrate to obtain green chips.

Further, when employing a sheet method, green sheets are formed using the paste for voltage nonlinear resistor layer. After that, a predetermined number of these green sheets are laminated to form the outer protective layers 8a shown in the FIGURE.

Next, on this outer protective layer 8a, the paste for internal electrode layer is printed in a predetermined pattern to form the internal electrode layer 4 of a green body. Similarly, on another of the outer protective layers 8a, the internal electrode layer 6 of the green body is formed.

These layers are overlapped so as to sandwich the interlayer voltage nonlinear resistor layer 8 formed by laminating a predetermined number of the green sheets and such that the internal electrode layers 4 and 6 are exposed on mutually opposing end surfaces. After that, the green body is pressure-bonded while being heated and cut in a predetermined shape to obtain green chips.

Next, debinding treatment and firing are performed on this green chip to prepare a sintered body (element body 10).

The debinding treatment for the green chip should be performed under normal conditions. For example, in an air atmosphere, the temperature rising rate is set to about 5 to 300° C./hour, the holding temperature is set to about 180 to 400° C., and the temperature holding time is set to about 0.5 to 24 hours.

Firing of the green chip should be performed under normal conditions. For example, in an air atmosphere, the temperature rising rate is set to about 50 to 500° C./hour, the holding temperature is set to about 1000 to 1400° C., the temperature holding time is set to about 0.5 to 8 hours, and the cooling rate is set to about 50 to 500° C./hour. Setting the holding temperature to about 1000° C. or more makes it easier for densification of the green chip to be sufficiently advanced. Setting the holding temperature to about 1400° C. or less makes it easier for abnormal sintering of the internal electrode and electrode discontinuity to be prevented.

The sintered body (element body 10) obtained as above is for example processed by end surface polishing, such as barrel polishing and sand blasting, is applied with the paste for external terminal electrode and then fired to form the external terminal electrodes 12 and 14. Firing conditions for the paste for external terminal electrodes are preferably set to, for example, about 600 to 900° C. in an air atmosphere for 10 minutes to one hour.

The thus manufactured laminated chip varistor 2 of the present embodiment is, for example, connected to the likes of a high speed transmission circuit, and is used for protecting such a circuit and the like, by absorbing or removing an external surge (abnormal voltage), such as static electricity, or noise, and so on.

Second Embodiment

A second embodiment will be described below. The first embodiment and the second embodiment are common other than the interlayer voltage nonlinear resistor layer 8. In the description below, points of difference from the first embodiment will be described in detail. Moreover, descriptions of points in common with the first embodiment will be omitted.

The interlayer voltage nonlinear resistor layer 8 is configured by a voltage nonlinear resistor ceramic according to the second embodiment. The voltage nonlinear resistor ceramic includes: a Zn oxide; a Co oxide; an R oxide; and a perovskite compound.

In the second embodiment, the content of Co oxide is not particularly limited. The content of Co oxide with respect to a zinc oxide 100 mole portion is preferably 0.30 to 10 mole portion, more preferably 0.50 to 7.0 mole portion, and even more preferably 0.50 to 5.0 mole portion in terms of Co.

Note that when Co oxide is not included, the leakage current tends to increase and ESD withstand capability tends to decrease.

The R element configuring the R oxide is at least one selected from Y, La, Ce, Pr, Nd, Sm, Eu, Gd, Tb, Dy, Ho, Er, Tm, Yb, and Lu. It preferably includes at least Pr or Tb, and particularly preferably includes at least Pr. In the second embodiment, the content of R oxide is not particularly limited. The content of R oxide with respect to a zinc oxide 100 mole portion is preferably 0.10 to 10 mole portion, more preferably 0.10 to 7.0 mole portion, and even more preferably 0.20 to 5.0 mole portion in terms of R.

Setting the content of R oxide within the above range makes it easier for the voltage nonlinear resistor ceramic to be maintained in a semiconductor state and also makes it possible to increase the diffusion rate of oxygen diffusing toward the crystal grain boundary.

Note that when R oxide is not included, ESD withstand capability particularly tends to decrease due to insufficient sintering.

The perovskite compound ($ABO_3$) has a sintering suppressing effect. That is, it has an effect of suppressing grain growth of crystal grain during sintering. The content of the perovskite compound is not particularly limited. The content of the perovskite compound with respect to a zinc oxide 100 mole portion is preferably 0.10 to 5.0 mole portion, more preferably 0.10 to 3.00 mole portion, and even more preferably 0.10 to 1.00 mole portion in terms of $ABO_3$. A is at least one kind of Ca and Sr, and B is at least one kind of Ti and Zr.

Note that the above sintering suppressing effect cannot be achieved by separately adding the A oxide and the B oxide instead of the perovskite compound.

The reason the above sintering suppressing effect cannot be achieved by separately adding the A oxide and the B oxide is considered to be as indicated below.

First, the reason the sintering suppressing effect during sintering can be achieved in the case where the perovskite compound is added is considered to be due to the perovskite structure of the perovskite compound itself.

In contrast, in the case where the A oxide and the B oxide are added separately, although it also sometimes occurs that the A oxide and the B oxide react during sintering to become the perovskite compound, it is not the case that the entire amount becomes the perovskite compound. Moreover, even if the perovskite compound is generated by the aforementioned reaction during sintering, the crystal grain has already ended up undergoing grain growth due to the sintering. Thus, the above sintering suppressing effect is considered to be unachievable by separately adding the A oxide and the B oxide.

When the perovskite compound is not included, grain growth of crystal grain ends up occurring, and crystal grain size ends up becoming non-uniform. As a result, the leakage current tends to increase, and good varistor characteristics are unlikely to be achieved.

The perovskite compound having a molar ratio A/B of the A and the B appropriately adjusted roughly in the range of 0.90 to 1.10 can be employed. By adjusting the molar ratio A/B of the A and the B, the perovskite structure of the perovskite compound can be stably maintained. Moreover, ESD withstand capability of the voltage nonlinear resistor ceramic according to the present embodiment can be improved. A/B is preferably not less than 0.995 and not more than 1.010.

Now, when the voltage nonlinear resistor ceramic according to the second embodiment substantively includes Ba oxide, moisture resistance sometimes significantly decreases.

The reason moisture resistance sometimes significantly decreases by Ba oxide being included in the voltage nonlinear resistor ceramic according to the present embodiment is considered to be because Ba oxide included in the voltage nonlinear resistor ceramic sometimes reacts with water vapor to become barium hydroxide.

Note that even when Ba is included in a form other than an oxide, moisture resistance sometimes significantly decreases. This is because sometimes Ba included in a form other than an oxide also ultimately changes to barium hydroxide by various kinds of reactions, thereby causing discoloration of the voltage nonlinear resistor ceramic or deterioration of varistor characteristics.

Note that the case of Ba being substantively included refers to the case where Ba is included exceeding 0.1 mole portion with respect to the zinc oxide 100 mole portion.

The voltage nonlinear resistor ceramic according to the second embodiment preferably further includes a Cr oxide, the above-described M1 oxide of the first embodiment, and/or the above-described M2 oxide of the first embodiment.

In the second embodiment, the Cr oxide has an effect of suppressing grain growth of crystal grain during sintering and improving the leakage current. The content of Cr oxide is not particularly limited. The content of Cr oxide with respect to a zinc oxide 100 mole portion is preferably 0.01 to 2.00 mole portion, more preferably 0.01 to 1.00 mole portion, and even more preferably 0.1 to 1.00 mole portion in terms of Cr.

In the second embodiment, by including the M1 oxide, it is possible to suppress grain size fluctuation and improve the leakage current and ESD withstand capability. The content of M1 oxide with respect to a zinc oxide 100 mole portion is preferably 0.10 to 5.0 mole portion, more preferably 0.10 to 3.0 mole portion, and even more preferably 0.10 to 2.0 mole portion in terms of M1.

In the second embodiment, by including the M2 oxide, it is possible to improve the leakage current and ESD withstand capability. The content of M2 oxide with respect to a zinc oxide 100 mole portion is preferably 0.0005 to 5.0 mole portion, more preferably 0.0005 to 3.0 mole portion, and even more preferably 0.001 to 2.0 mole portion in terms of M2.

As above, the embodiments of the present invention were explained. However, the present invention is not limited to these embodiments, and may be embodied in various forms without departing from the scope of the present invention.

For example, in the embodiments mentioned above, a laminated chip varistor is exemplified as an electronic component according to the present invention. However, the electronic component according to the present invention is not limited to the laminated chip varistor, and may be anything as long as it has a voltage nonlinear resistor layer configured by a voltage nonlinear resistor ceramic composition having the above composition.

Moreover, the electronic component according to the present invention is not limited to a laminated chip varistor having only one pair of internal electrode layers as shown in the FIGURE. Although there is only one pair of internal electrode layers in the FIGURE, a plurality of pairs of internal electrodes may be laminated, or there may be a laminated chip varistor in which a large number of internal electrodes are laminated.

EXAMPLES

The present invention will be described below based on more detailed examples. Note that the present invention is not limited to these examples.

Example 1

First, materials of Zn, Co, Pr, Cr, Sr, and Ga, and strontium titanate were prepared. Zinc oxide was prepared as the material of Zn. Prepared as the materials of Co, Pr, Cr, Sr, and Ga were oxides of each of the elements or appropriately selected compounds that becomes oxides of each of the elements after firing. Specifically exemplified as compounds that become oxides of each of the elements after firing are carbonates, carbonate hydrates, and the like. Strontium titanate was synthesized beforehand from titanium oxide and strontium oxide.

Next, these materials were combined such that the composition after firing attains the composition shown in Table 1 with respect to a zinc oxide 100 mole portion. Then, an organic binder, an organic solvent, and a plasticizing agent were added, and wet-blending was performed for approximately 20 hours by a ball mill, whereby a slurry was prepared.

The slurry was coated with a thickness of 11 μm on a PET film by a doctor blade method to prepare a plurality of green sheets.

A screen printing was performed on the green sheet using a palladium paste so as to attain a desired shape, and drying was performed to form the internal electrode layers 4 and 6 shown in the FIGURE. Note that the palladium paste was manufactured by wet-blending the above-described organic binder and organic solvent and palladium oxide.

Furthermore, a plurality of the green sheets were overlapped, and a later-mentioned heating and pressure-bonding were performed, whereby a portion that is to be the interlayer voltage nonlinear resistor layer 8 and a portion that is to be the outer protective layer 8a shown in the FIGURE were formed, and a stacked body of the green sheets was formed. Note that the portion that is to be the outer protective layer 8a was formed by overlapping a plurality of the green sheets not having the internal electrode layers 4 and 6 formed therein.

Then, the stacked body of green sheets was heated and pressure-bonded. This was then cut so as to attain a predetermined chip shape, whereby green chips were formed.

After the debinding treatment was performed on the green chips at 350° C. for two hours, firing was performed at 1190° C. for two hours in the atmosphere, whereby a sintered body serving as the element body 10 was obtained.

Next, a silver paste was applied to both ends of the obtained sintered body, and firing was performed thereon at 800° C. to form terminal electrodes 12 and 14, whereby the laminated chip varistor 2 having a configuration of the cross-sectional view shown in the FIGURE was obtained. The silver paste was manufactured by wet-blending the above-described organic binder and organic solvent and silver oxide.

The size of the obtained laminated chip varistor 2 was 0.6 mm×0.3 mm×0.3 mm, the thickness of the voltage nonlinear resistor layer 8 was 7 μm, and the number of voltage nonlinear resistor layers 8 sandwiched by internal electrode layers 4 and 6 was three. Moreover, the overlapping area of the internal electrode layers 4 and 6 was 0.045 mm².

By using the obtained laminated chip varistor samples (hereafter, sometimes referred to simply as varistor samples), average grain size, varistor voltage, leakage current (Id), and ESD withstand capability were measured.

Average Grain Size (Gs)

In order to measure the average grain size, the varistor sample was cut so that a cross section of the voltage nonlinear resistor layer appears, and the cross section was observed by a scanning electron microscope (SEM) (JSM-6510LA, manufactured by JEOL Ltd.) to take an SEM photo at a magnification of 4000 times. An image processing was performed on this SEM photo by a software (Analysis Station, manufactured by JEOL Ltd.) to determine the boundary of semiconductor particles whereby the cross-sectional area of each semiconductor particle was calculated. Then, the grain size was calculated by converting the calculated cross-sectional area of the semiconductor particle to a circle equivalent diameter. An average value of the obtained grain size was determined as the average grain size (Gs). Note that calculation of grain size was performed for twenty semiconductor particles included in the SEM photo. In the present example, an average grain size (Gs) of 2.0 μm or less was considered excellent. The results are shown in Tables 1 to 6.

Varistor Voltage

The varistor sample was connected to a DC constant voltage power supply, and the voltage applied between both electrodes of the varistor sample was measured by a voltage meter while the current flowing in the varistor sample was read by an ammeter, whereby the varistor voltage ($V_{1mA}$) was evaluated. Specifically, when the current flowing in the varistor sample was 1 mA, the voltage applied between electrodes of the varistor sample was read by the voltage meter and the value obtained therefrom was determined as the varistor voltage (unit V). The results are shown in Tables 1 to 6.

Leakage Current (Id)

The leakage current (Id) in the present example was determined as the current when the applied voltage is 3 V. In the present example, a leakage current (Id) of less than 5000 nA was considered excellent. The results are shown in Tables 1 to 6.

ESD Withstand Capability

ESD withstand capability in the present example was measured by the electrostatic discharge immunity test specified in IEC61000-4-2. In the present example, an ESD withstand capability of 12 kV or more was considered excellent. The results are shown in Tables 1 to 6.

TABLE 1

| Sample No. | Co mole portion | Pr mole portion | Cr mole portion | Sr mole portion | Ga mole portion | SrTiO3 mole portion | Average Grain Size Gs μm | Varistor Voltage V1mA V | Id@3 V nA | ESD Withstand Capability kV |
|---|---|---|---|---|---|---|---|---|---|---|
| 3 | 0.30 | 2.50 | 0.50 | 0.25 | 0.20 | 1.00 | 1.83 | 6.8 | 3401 | 19 |
| 4 | 0.50 | 2.50 | 0.50 | 0.25 | 0.20 | 1.00 | 1.80 | 7.4 | 1719 | 24 |
| 5 | 1.00 | 2.50 | 0.50 | 0.25 | 0.20 | 1.00 | 1.81 | 7.7 | 877 | 24 |
| 6 | 2.00 | 2.50 | 0.50 | 0.25 | 0.20 | 1.00 | 1.76 | 8.0 | 217 | 21 |
| 7 | 5.00 | 2.50 | 0.50 | 0.25 | 0.20 | 1.00 | 1.80 | 8.5 | 71 | 16 |
| 8 | 10.00 | 2.50 | 0.50 | 0.25 | 0.20 | 1.00 | 1.77 | 9.7 | 12 | 14 |
| 11 | 1.00 | 0.10 | 0.50 | 0.25 | 0.20 | 1.00 | 1.85 | 12.8 | 3 | 14 |
| 12 | 1.00 | 0.30 | 0.50 | 0.25 | 0.20 | 1.00 | 1.77 | 12.3 | 29 | 19 |
| 13 | 1.00 | 0.50 | 0.50 | 0.25 | 0.20 | 1.00 | 1.81 | 11.1 | 97 | 20 |
| 14 | 1.00 | 1.00 | 0.50 | 0.25 | 0.20 | 1.00 | 1.80 | 8.3 | 225 | 24 |
| 5 | 1.00 | 2.50 | 0.50 | 0.25 | 0.20 | 1.00 | 1.81 | 7.7 | 877 | 24 |
| 15 | 1.00 | 5.00 | 0.50 | 0.25 | 0.20 | 1.00 | 1.76 | 7.5 | 1902 | 17 |
| 16 | 1.00 | 10.00 | 0.50 | 0.25 | 0.20 | 1.00 | 1.66 | 6.9 | 4067 | 14 |
| 19 | 1.00 | 2.50 | 0.01 | 0.25 | 0.20 | 1.00 | 1.91 | 6.1 | 4596 | 24 |
| 20 | 1.00 | 2.50 | 0.10 | 0.25 | 0.20 | 1.00 | 1.83 | 6.5 | 1452 | 22 |
| 5 | 1.00 | 2.50 | 0.50 | 0.25 | 0.20 | 1.00 | 1.81 | 7.7 | 877 | 24 |
| 21 | 1.00 | 2.50 | 1.00 | 0.25 | 0.20 | 1.00 | 1.75 | 8.1 | 576 | 19 |
| 22 | 1.00 | 2.50 | 2.00 | 0.25 | 0.20 | 1.00 | 1.69 | 8.5 | 201 | 14 |
| 26 | 1.00 | 2.50 | 0.50 | 0.10 | 0.20 | 1.00 | 1.79 | 8.2 | 299 | 16 |
| 5 | 1.00 | 2.50 | 0.50 | 0.25 | 0.20 | 1.00 | 1.81 | 7.7 | 877 | 24 |
| 27 | 1.00 | 2.50 | 0.50 | 0.50 | 0.20 | 1.00 | 1.83 | 7.3 | 1056 | 24 |
| 28 | 1.00 | 2.50 | 0.50 | 1.00 | 0.20 | 1.00 | 1.88 | 6.9 | 1451 | 20 |
| 29 | 1.00 | 2.50 | 0.50 | 2.00 | 0.20 | 1.00 | 1.91 | 6.3 | 2051 | 17 |
| 30 | 1.00 | 2.50 | 0.50 | 5.00 | 0.20 | 1.00 | 1.97 | 5.8 | 4821 | 16 |
| 34 | 1.00 | 2.50 | 0.50 | 0.25 | 0.0005 | 1.00 | 1.79 | 8.6 | 212 | 14 |
| 35 | 1.00 | 2.50 | 0.50 | 0.25 | 0.001 | 1.00 | 1.83 | 8.4 | 309 | 17 |
| 36 | 1.00 | 2.50 | 0.50 | 0.25 | 0.01 | 1.00 | 1.77 | 7.9 | 547 | 22 |
| 5 | 1.00 | 2.50 | 0.50 | 0.25 | 0.20 | 1.00 | 1.81 | 7.7 | 877 | 24 |
| 37 | 1.00 | 2.50 | 0.50 | 0.25 | 0.50 | 1.00 | 1.83 | 7.5 | 1222 | 24 |
| 38 | 1.00 | 2.50 | 0.50 | 0.25 | 1.00 | 1.00 | 1.79 | 7.3 | 1619 | 24 |
| 39 | 1.00 | 2.50 | 0.50 | 0.25 | 2.00 | 1.00 | 1.82 | 6.9 | 2102 | 24 |
| 40 | 1.00 | 2.50 | 0.50 | 0.25 | 5.00 | 1.00 | 1.79 | 6.1 | 3398 | 24 |
| 43 | 1.00 | 2.50 | 0.50 | 0.25 | 0.20 | 0.10 | 1.98 | 6.1 | 4801 | 19 |
| 44 | 1.00 | 2.50 | 0.50 | 0.25 | 0.20 | 0.20 | 1.94 | 7.0 | 2779 | 24 |
| 45 | 1.00 | 2.50 | 0.50 | 0.25 | 0.20 | 0.30 | 1.89 | 6.8 | 1630 | 22 |
| 46 | 1.00 | 2.50 | 0.50 | 0.25 | 0.20 | 0.50 | 1.83 | 7.3 | 1219 | 24 |
| 5 | 1.00 | 2.50 | 0.50 | 0.25 | 0.20 | 1.00 | 1.81 | 7.7 | 877 | 24 |
| 47 | 1.00 | 2.50 | 0.50 | 0.25 | 0.20 | 3.00 | 1.74 | 8.4 | 209 | 18 |
| 48 | 1.00 | 2.50 | 0.50 | 0.25 | 0.20 | 5.00 | 1.55 | 10.7 | 56 | 13 |

It could be confirmed from Table 1 that, for a sample within the range of the present invention, average grain size, leakage current, and ESD withstand capability were all excellent.

Example 2

In sample number 5 of example 1, varistor samples were prepared using Bi (sample number 50) and Sb (sample number 51) instead of Pr. The results are shown in Table 2.

TABLE 2

| Sample No. | Pr mole portion | Bi mole portion | Sb mole portion | Average Grain Size Gs μm | Varistor Voltage V1mA V | Id@3 V nA | ESD Withstand Capability kV |
|---|---|---|---|---|---|---|---|
| 5 | 2.50 | 0.00 | 0.00 | 1.81 | 7.7 | 877 | 24 |
| 50 | 0.00 | 2.50 | 0.00 | 1.92 | 6.5 | 56167 | 4 |
| 51 | 0.00 | 0.00 | 2.50 | 1.89 | 7.0 | 34091 | 8 |

It could be confirmed from Table 2 that when Bi and Sb which are not included in R of the invention of the present application were employed instead of Pr, leakage current and ESD withstand voltage deteriorated.

Example 3

In sample number 5 of example 1, varistor samples of sample numbers 52 to 66 were prepared by changing the kind of R from Pr. The results are shown in Table 3.

TABLE 3

| Sample No. | with respect to 100 mole portion of zinc oxide R | | Average Grain Size Gs μm | Varistor Voltage V1mA V | Id@3 V nA | ESD Withstand Capability kV |
|---|---|---|---|---|---|---|
| | kind | mole portion | | | | |
| 5 | Pr | 2.50 | 1.81 | 7.7 | 877 | 24 |
| 52 | Y | 2.50 | 1.90 | 8.0 | 491 | 20 |
| 53 | Nd | 2.50 | 1.81 | 7.6 | 811 | 24 |
| 54 | Sm | 2.50 | 1.87 | 7.8 | 613 | 24 |
| 55 | Eu | 2.50 | 1.92 | 8.5 | 239 | 24 |
| 56 | Gd | 2.50 | 1.89 | 8.1 | 475 | 24 |
| 57 | Tb | 2.50 | 1.95 | 8.2 | 313 | 19 |
| 58 | Dy | 2.50 | 1.88 | 7.8 | 712 | 24 |
| 59 | Ho | 2.50 | 1.87 | 7.5 | 991 | 20 |
| 60 | Er | 2.50 | 1.92 | 8.1 | 175 | 20 |
| 61 | Tm | 2.50 | 1.83 | 7.6 | 1021 | 19 |
| 62 | Lu | 2.50 | 1.88 | 7.9 | 668 | 24 |
| 63 | Ce | 2.50 | 1.91 | 7.9 | 420 | 24 |
| 64 | Yb | 2.50 | 1.87 | 8.0 | 299 | 24 |
| 65 | La | 2.50 | 1.85 | 7.3 | 1470 | 20 |
| 66 | Pr, Y | Pr: 1.50 Y: 1.00 | 1.86 | 7.4 | 890 | 24 |

It could be confirmed from Table 3 that even when the other elements included in R of the invention of the present application were employed instead of Pr, all of the characteristics were excellent.

Example 4

In sample number 5 of example 1, varistor samples were prepared by changing the kind of M2 from Ga to Al (sample number 67) and In (sample number 68). The results are shown in Table 4.

TABLE 4

| Sample No. | with respect to 100 mole portion of zinc oxide M2 | | Average Grain Size Gs μm | Varistor Voltage V1mA V | Id@3 V nA | ESD Withstand Capability kV |
|---|---|---|---|---|---|---|
| | kind | mole portion | | | | |
| 5 | Ga | 0.20 | 1.81 | 7.7 | 877 | 24 |
| 67 | Al | 0.20 | 1.80 | 7.8 | 721 | 21 |
| 68 | In | 0.20 | 1.74 | 7.5 | 1015 | 20 |

It could be confirmed from Table 4 that even when Al and In were employed instead of Ga, all of the characteristics were excellent.

Example 5

In sample number 5 of example 1, a varistor sample using barium titanate instead of strontium titanate (sample number 69) and a varistor sample using barium oxide instead of strontium oxide (sample number 70) were prepared. Moreover, a moisture resistance test was carried out on the varistor samples of sample numbers 5, 69, and 70, under conditions of 130° C., 85% humidity, 2.3 atmospheres, and 60 hours. For the post-moisture resistance test varistor samples, measurement of various kinds of characteristics was performed and presence/absence of an appearance defect was confirmed. In the confirmation of presence/absence of an appearance defect, specifically, presence/absence of discoloration was confirmed. The results are shown in Table 5.

TABLE 5

| Sample No. | with respect to 100 mole portion of zinc oxide | | | | Moisture Resistance Test 130° C., 85% R.H. 2.3 atm, 60 h | Appearance | Average Grain Size Gs μm | Varistor Voltage V1mA V | Id@3 V nA | ESD Withstand Capability kV |
|---|---|---|---|---|---|---|---|---|---|---|
| | Sr mole portion | Ba mole portion | SrTiO3 mole portion | BaTiO3 mole portion | | | | | | |
| 5 | 0.25 | 0.00 | 1.00 | 0.00 | pre-test | excellent | 1.81 | 7.7 | 877 | 24 |
| | | | | | post-test | excellent | 1.81 | 7.6 | 845 | 24 |
| 69 | 0.25 | 0.00 | 0.00 | 1.00 | pre-test | excellent | 1.69 | 7.2 | 240 | 12 |
| | | | | | post-test | defective | 1.69 | 0.4 | >measure limit | 4 |
| 70 | 0.00 | 0.25 | 1.00 | 0.00 | pre-test | excellent | 1.85 | 8.1 | 2891 | 14 |
| | | | | | post-test | defective | unmeasureable since chip mas in pieces | | | |

Before the moisture resistance test, the varistor samples of sample number 5, sample number 69, and sample number 70 each showed excellent characteristics. However, whereas the varistor sample of sample number 5 showed excellent characteristics without an appearance defect even after the moisture resistance test, the varistor sample of sample number 69 using barium titanate instead of strontium titanate gave rise to an appearance defect after the moisture resistance test. Specifically, a discoloration of green color occurred. Moreover, leakage current and ESD withstand capability deteriorated. Furthermore, the varistor sample of sample number 70 using barium oxide instead of strontium oxide ended up in pieces after the moisture resistance test. Because it ended up in pieces, characteristics after the moisture resistance test were also unable to be measured.

Example 6

In sample number 5 of example 1, a varistor sample (sample number 71) was prepared by adding 0.25 mole portion of Ti in the form of $TiO_2$, instead of a strontium titanate 1.00 mole portion. The results are shown in Table 6.

TABLE 6

| Sample No. | with respect to 100 mole portion of zinc oxide | | | Average Grain Size Gs μm | Varistor Voltage V1mA V | Id@3 V nA | ESD Withstand Capability kV |
|---|---|---|---|---|---|---|---|
| | Sr mole portion | Ti mole portion | SrTiO3 mole portion | | | | |
| 5 | 0.25 | 0.00 | 1.00 | 1.81 | 7.7 | 877 | 24 |
| 71 | 0.25 | 0.25 | 0.00 | 2.35 | 4.2 | 91419 | 20 |

It could be confirmed from Table 6 that when strontium oxide and titanium oxide are included separately without strontium titanate being included, average grain size and leakage current become too large.

Furthermore, presence/absence and magnitude of a peak indicating strontium titanate were measured by X-ray diffraction measurement for post-sintering sample numbers 5 and 71. A peak indicating strontium titanate was detected also in sample number 71, similarly to in sample number 5. However, magnitude of the peak indicating strontium titanate was significantly smaller compared to in sample number 5. Moreover, in sample number 71, average grain size was 2.35 μm and exceeded 2.0 μm. Hence, in sample number 71, the sintering suppressing effect of strontium titanate is clearly not displayed. As above, it may also be inferred from post-sintering sample number 71 that strontium titanate did not exist in pre-sintering sample number 71.

Example 7

In sample 5 of example 1, varistor samples were prepared using, respectively, 1.00 mole portion of calcium titanate (sample number 81), 1.00 mole portion of calcium zirconate (sample number 82), and 1.00 mole portion of strontium zirconate (sample number 83), instead of a strontium titanate 1.00 mole portion. Calcium titanate was synthesized beforehand from titanium oxide and calcium oxide. Calcium zirconate was synthesized beforehand from zirconium oxide and calcium oxide. Strontium zirconate was synthesized beforehand from zirconium oxide and strontium oxide.

A moisture resistance test was carried out on the varistor samples of sample numbers 81 to 83, under conditions of 130° C., 85% humidity, 2.3 atmospheres, and 60 hours. Measurement of various kinds of characteristics was performed for the post-moisture resistance test varistor samples. The results are shown in Table 7.

TABLE 7

| Sample No. | Subcomponent (with respect to 100 mole portion of zinc oxide) | | | | | Subcomponent (Perovskite Compound) ABO3: 1.00 mole portion | | | Moisture Resistance 130° C., 85% R.H. 2.3 atm, 60 h | Average Grain Size Gs μm | Varistor Voltage V1mA V | Id@3 V nA | ESD Withstand Capability kV |
|---|---|---|---|---|---|---|---|---|---|---|---|---|---|
| | Co mole portion | Pr mole portion | Cr mole portion | Sr mole portion | Ga mole portion | A | B | A/B | | | | | |
| 5 | 1.00 | 2.50 | 0.50 | 0.25 | 0.20 | Sr | Ti | 1.000 | OK | 1.81 | 7.6 | 845 | 24 |
| 81 | 1.00 | 2.50 | 0.50 | 0.25 | 0.20 | Ca | Ti | 1.000 | OK | 1.92 | 7.1 | 621 | 22 |
| 82 | 1.00 | 2.50 | 0.50 | 0.25 | 0.20 | Ca | Zr | 1.000 | OK | 1.79 | 7.8 | 1015 | 24 |
| 83 | 1.00 | 2.50 | 0.50 | 0.25 | 0.20 | Sr | Zr | 1.000 | OK | 1.83 | 7.4 | 799 | 20 |

It could be confirmed from Table 7 that even when the kind of perovskite compound was changed, all of the characteristics, such as moisture resistance, were excellent.

Example 8

In sample number 5 of example 1, varistor samples were produced by changing Sr/Ti of the strontium titanate (sample numbers 91 to 95). The Sr/Ti was produced by changing a mix proportion of titanium oxide and strontium oxide during strontium titanate production.

A moisture resistance test was carried out on the varistor samples of sample numbers 91 to 95, under conditions of 130° C., 85% humidity, 2.3 atmospheres, and 60 hours. Measurement of various kinds of characteristics was performed for the post-moisture resistance test varistor samples. The results are shown in Table 8.

TABLE 8

| Sample No. | Subcomponent (with respect to 100 mole portion of zinc oxide) | | | | | Perovskite Compound | | Moisture Resistance 130° C., 85% R.H. 2.3 atm, 60 h | Average Grain Size Gs μm | Varistor Voltage V1mA V | Id@3 V nA | ESD Withstand Capability kV |
|---|---|---|---|---|---|---|---|---|---|---|---|---|
| | Co mole portion | Pr mole portion | Cr mole portion | Sr mole portion | Ga mole portion | SrTiO3 mole portion | Sr/Ti no unit | | | | | |
| 91 | 1.00 | 2.50 | 0.50 | 0.25 | 0.20 | 1.00 | 0.995 | OK | 1.73 | 7.2 | 773 | 16 |
| 92 | 1.00 | 2.50 | 0.50 | 0.25 | 0.20 | 1.00 | 0.998 | OK | 1.77 | 7.4 | 692 | 20 |

TABLE 8-continued

| Sample No. | Subcomponent (with respect to 100 mole portion of zinc oxide) | | | | | | Moisture Resistance 130° C., 85% R.H. 2.3 atm, 60 h | Average Grain Size Gs μm | Varistor Voltage V1mA V | Id@3 V nA | ESD Withstand Capability kV |
|---|---|---|---|---|---|---|---|---|---|---|---|
| | Co mole portion | Pr mole portion | Cr mole portion | Sr mole portion | Ga mole portion | Perovskite Compound | | | | | |
| | | | | | | SrTiO3 mole portion | Sr/Ti no unit | | | | |
| 5 | 1.00 | 2.50 | 0.50 | 0.25 | 0.20 | 1.00 | 1.000 | OK | 1.81 | 7.6 | 845 | 24 |
| 93 | 1.00 | 2.50 | 0.50 | 0.25 | 0.20 | 1.00 | 1.002 | OK | 1.68 | 7.7 | 893 | 22 |
| 94 | 1.00 | 2.50 | 0.50 | 0.25 | 0.20 | 1.00 | 1.005 | OK | 1.73 | 6.9 | 512 | 24 |
| 95 | 1.00 | 2.50 | 0.50 | 0.25 | 0.20 | 1.00 | 1.010 | OK | 1.80 | 7.3 | 226 | 14 |

It could be confirmed from Table 8 that in spite of changing Sr/Ti, all of the characteristics, such as moisture resistance, were excellent.

DESCRIPTION OF THE NUMERALS

2 ... laminated chip varistor
4, 6 ... internal electrode layer
8 ... interlayer voltage nonlinear resistor layer
8a ... outer protective layer
10 ... element body
12, 14 ... external terminal electrode

The invention claimed is:

1. A voltage nonlinear resistor ceramic, comprising:
a Zn oxide; a Co oxide; an R oxide; a Cr oxide; an M1 oxide; an M2 oxide; and strontium titanate,
R being at least one kind selected from a group consisting of Y, La, Ce, Pr, Nd, Sm, Eu, Gd, Tb, Dy, Ho, Er, Tm, Yb, and Lu,
M1 being at least one kind selected from a group consisting of Ca and Sr,
M2 being at least one kind selected from a group consisting of Al, Ga, and In, and
when content of the Zn oxide is assumed to be 100 mole portion in terms of Zn,
content of the Co oxide being 0.30 to 10 mole portion in terms of Co,
content of the R oxide being 0.10 to 10 mole portion in terms of R,
content of the Cr oxide being 0.01 to 2 mole portion in terms of Cr,
content of the M1 oxide being 0.10 to 5 mole portion in terms of M1,
content of the M2 oxide being 0.0005 to 5 mole portion in terms of M2, and
content of the strontium titanate being 0.10 to 5 mole portion in terms of $SrTiO_3$.

2. A voltage nonlinear resistor ceramic, comprising:
a Zn oxide; a Co oxide; an R oxide; and a perovskite compound,
the voltage nonlinear resistor ceramic substantively not comprising Ba,
R being at least one kind selected from a group consisting of Y, La, Ce, Pr, Nd, Sm, Eu, Gd, Tb, Dy, Ho, Er, Tm, Yb, and Lu, and
the perovskite compound being expressed by a general formula $ABO_3$,
"A" being at least one kind of Ca and Sr, and
"B" being at least one kind of Ti and Zr.

3. The voltage nonlinear resistor ceramic according to claim 2, wherein
a molar ratio A/B of A and B in the perovskite compound is not less than 0.995 and not more than 1.010.

4. An electronic component having a voltage nonlinear resistor layer configured from the voltage nonlinear resistor ceramic recited in claim 1.

5. An electronic component having a voltage nonlinear resistor layer configured from the voltage nonlinear resistor ceramic recited in claim 2.

6. An electronic component having a voltage nonlinear resistor layer configured from the voltage nonlinear resistor ceramic recited in claim 3.

* * * * *